United States Patent
Decasper et al.

(10) Patent No.: US 7,613,131 B2
(45) Date of Patent: Nov. 3, 2009

(54) OVERLAY NETWORK INFRASTRUCTURE

(75) Inventors: Dan Decasper, San Mateo, CA (US); Zubin Dittia, San Mateo, CA (US); Prashanth Mundkur, Menlo Park, CA (US); Rajib Ghosh, Redwood City, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 697 days.

(21) Appl. No.: 11/271,077

(22) Filed: Nov. 10, 2005

(65) Prior Publication Data

US 2007/0104115 A1 May 10, 2007

(51) Int. Cl.
*H04L 12/28* (2006.01)
(52) U.S. Cl. ................. 370/254; 370/400; 709/203
(58) Field of Classification Search ........... 370/389, 370/400, 254; 709/203, 238
See application file for complete search history.

(56) References Cited

U.S. PATENT DOCUMENTS

| | | | |
|---|---|---|---|
| 6,289,382 B1 | 9/2001 | Bowman-Amuah | |
| 6,332,163 B1 | 12/2001 | Bowman-Amuah | |
| 6,339,832 B1 | 1/2002 | Bowman-Amuah | |
| 6,715,145 B1 | 3/2004 | Bowman-Amuah | |
| 6,742,015 B1 | 5/2004 | Bowman-Amuah | |
| 6,842,906 B1 | 1/2005 | Bowman-Amuah | |
| 7,072,807 B2 | 7/2006 | Brown et al. | |
| 7,162,509 B2 | 1/2007 | Brown et al. | |
| 7,200,530 B2 | 4/2007 | Brown et al. | |
| 7,317,717 B2 * | 1/2008 | Pankajakshan et al. | 370/352 |
| 2002/0026531 A1 * | 2/2002 | Keane et al. | 709/250 |
| 2002/0116481 A1 * | 8/2002 | Lee | 709/220 |
| 2002/0199007 A1 * | 12/2002 | Clayton et al. | 709/230 |
| 2004/0006708 A1 * | 1/2004 | Mukherjee et al. | 713/201 |
| 2005/0160095 A1 * | 7/2005 | Dick et al. | 707/10 |
| 2006/0041761 A1 * | 2/2006 | Neumann et al. | 713/189 |
| 2006/0080441 A1 * | 4/2006 | Chen et al. | 709/225 |

* cited by examiner

*Primary Examiner*—Min Jung
(74) *Attorney, Agent, or Firm*—Choate Hall & Stewart, LLP; John D. Lanza; Christopher J. McKenna

(57) ABSTRACT

A method and apparatus for processing an overlay network infrastructure. In one embodiment, the method comprises a plurality of transparent access points (TAPs). Each TAP is communicably coupled between one or more clients and servers and a wide area network (WAN) to enable the one or more clients to communicate with the one or more servers, and is coupled to other of the TAPs via permanently, established secure links. The overlay network also comprises a controller coupled to each of the TAPs via a secure connection to configure the TAPs with information to enable each TAP to know what services are available and from which of the TAPs each of the services can be accessed.

27 Claims, 7 Drawing Sheets

OVERLAY NETWORK INFRASTRUCTURE

FIELD OF THE INVENTION

The present invention relates to the field of networks; more particularly, the present invention relates to an overlay network that may be used, for example, to provide services to clients over a wide area network.

BACKGROUND OF THE INVENTION

As enterprises increasingly deploy applications across wide area networks (WANs), performance and security for applications such as web, web services, e-mail, remote file systems and custom applications becomes important issues. It is difficult to impossible for most developers and architects to write and deploy applications that run efficiently and securely across WANs, because in-depth networking knowledge is required to do so. Most application developers, architects, administrators lack those skills. As a result, applications, while working fine in local area networks, perform poorly over WANs and might introduce security problems. These problems exist both for internal applications which need to run between data centers or remote offices, as well as external applications deployed between business partners.

SUMMARY OF THE INVENTION

A method and apparatus is disclosed herein for providing acceleration and security services to clients. In one embodiment, an overlay network comprises a plurality of transparent access points (TAPs). Each TAP is communicably coupled between one or more clients and servers and a wide area network (WAN) to enable the one or more clients to communicate with the one or more servers, and is coupled to other of the TAPs via permanently, established, accelerated and secure links. The overlay network also comprises a controller coupled to each of the TAPs via a secure connection to configure the TAPs with information to enable each TAP to know what servers and services are available and from which of the TAPs each of the services can be accessed fast and securely.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
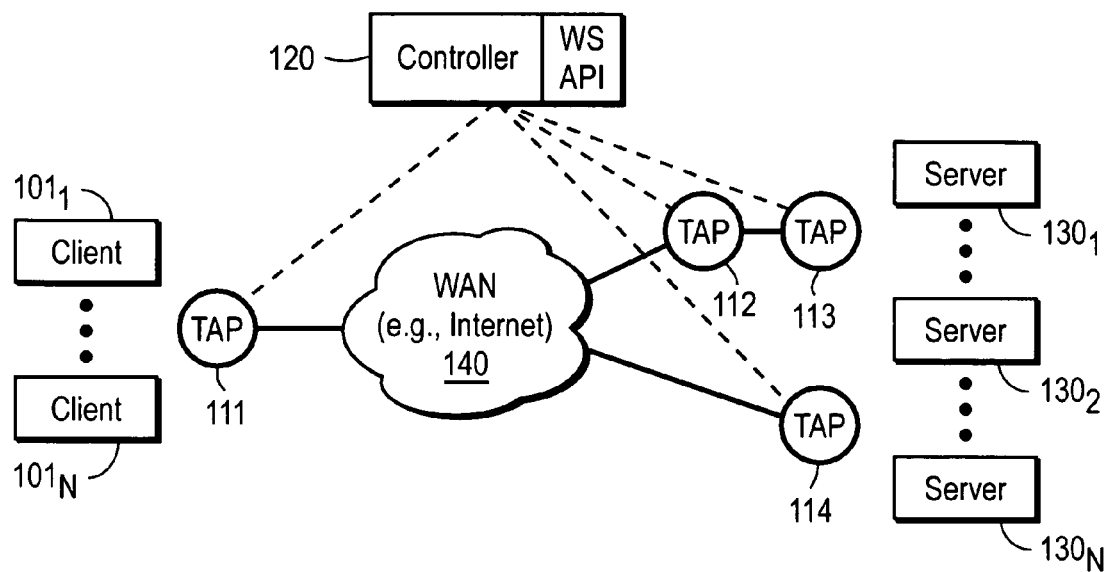
FIG. 1 is a block diagram of one embodiment of a transparent overlay network architecture.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Overlay Network Architecture

An overlay network architecture is set forth herein. The overlay network architecture is particularly suited for use as a services infrastructure. In one embodiment, the services are web services; however, the overlay network may be used for other services (e.g., TCP services, UDP services, e-mail, remote file systems, web browser-based applications etc.) and to support other communications. The infrastructure includes a secure overlay data accelerator. FIG. 1 is a block diagram of one embodiment of a transparent overlay network architecture. Referring to FIG. 1, the transparent overlay network includes a controller 120 and multiple Transparent Access Points (TAPs) 111-114. Although only four are shown, there may be any number of TAPs. In one embodiment, there is one TAP per network segment. In one embodiment, each TAP comprises a hardware (or combination hardware/software) appliance. In still another embodiment, the TAPs located at the application servers or data center are a hardware (or combination hardware/software) appliance, but the TAPs at one or more (or all) clients are software. Alternatively, each TAP may comprise software. Such TAP software may reside directly on a server, client personal computer (PCs), or mobile devices such as smart phones or PDAs, or may reside on another device.

Controller 120 provides a central administration point. In one embodiment, TAPs 111-114 are centrally configured and maintained through controller 120. In one embodiment, controller 120 builds and maintains a network topology map that includes all TAPs and routers, as well as how they are interconnected. In one embodiment, controller 120 also stores network link properties such as, for example, delays and bandwidths, along with a topology map of the overlay network.

In one embodiment, controller 120 monitors the network topology and validates, schedules, and routes data transfers. Application data flows directly between TAPs, thereby reducing network load (e.g., number of hits) and improving application response time. Whenever controller 120 authorizes and initiates a data exchange, controller 120 considers the end point's relative location and available network resources to route, schedule and control the bandwidth of these exchanges. In one embodiment, controller 120 selects a route to use between TAPs to access a service from a server. Thus, controller 120 centrally authorizes, monitors, and controls services (e.g., web services, e-mail, remote file system) traffic between applications and enables services to flow in a secure manner. This may also eliminate the need for XML firewalls, IPSec or SSL VPNs, load balancers or traffic shapers for most enterprise applications.

In one embodiment, TAPs 112-114 are deployed in front of application servers, such as application servers $130_1$-$130_N$. Application servers $130_{1-N}$ (e.g., web services servers, web servers, e-mail servers, file system servers, TCP services servers, UDP services servers) perform functions based on requests. For example, these functions may include serving a web page to one of clients $101_{1-N}$ in response to a program call made by a browser running on such a client. In one embodiment, each service (e.g., web services servers, web servers, e-mail servers, file system servers, TCP services servers, UDP services servers) communicates with a TAP. Web and web services applications are configured to use TAPs 111-114 as an HTTP proxy. Alternatively, a TAP may comprise an appliance installed as a bridge that functions as a transparent proxy without requiring any application configuration or modification. This model has the added advantage to also work with all non-HTTP applications, (e.g., e-mail services, file system services, TCP services, UDP services).

Note that FIG. 1 shows all application servers $130_{1-N}$ on one side of wide area network (WAN) 140 (e.g., the Internet), while all clients $101_{1-N}$ on the other side of WAN 140. However, an individual TAP may be shared by one or more clients and one or more servers. Also one TAP may have multiple connections to multiple TAPs.

In one embodiment, communication between TAPs 111-114 and controller 120 happens over a secure connection. The secure connection may be a SSL/TLS connection. In one embodiment, individual TAPs 111-114 are communicably coupled to each other via permanently established, secure TCP connections. In one embodiment, communications between application servers $130_{1-N}$ and clients $101_{1-N}$ occurs using the secured links between TAPs as a virtual private networks (VPNs). The VPN may be provided for all IP-based protocols (e.g., TCP, UDP). That is, these links may be TCP connections. Thus, they are only one hop away.

When operating, TAP 111 intercepts (or receives) a service request from client 111. In one embodiment, TAP 111 performs various computations on the request. These computations may be performed for one or more of security, performance, and reliability and are described in more detail below. After the computations have been performed, a path or route is identified to send the request from TAP 111 to a destination TAP (e.g., one of TAPs 112-114), which one of the TAPs associated with the application server targeted for the request. The request is then routed over a new or previously established connection to the destination TAP. Note that this path may include one or more intermediate TAPs. Once the request reaches the destination TAP, it may undergo further computations before being forwarded on to the server.

In one embodiment, the TAP overlay network implements security, acceleration and reliability. In one embodiment, TAPs 111-114 perform security operations (e.g., XML security operations) on behalf of applications that it secures. When TAPs are deployed in front of servers, they can be configured to secure existing applications. Such security ensures that the applications, and thus clients $101_1$-$101_N$, accessing the services are authenticated and authorized to access a service, and that all the data is encrypted in transit. In one embodiment, this configuration is done without modifying existing applications. Thus, security mechanisms do not have to be incorporated into every application.

In one embodiment, the overlay network architecture comes with built-in end-to-end security, including sophisticated certificate management, dynamic VPN functionality, and an XML firewall, and TAPs perform the following security operations: establish a dynamic VPN to encrypt and authenticate all communication between clients $101_1$-$101_N$ and application servers $130_{1-N}$ route and forward incoming and outgoing messages based on their content (e.g., their XML content), centrally authorize data transfer through a distributed XML firewall implemented by each TAP, authorize access based on end point certificates, and authorize access based on user credentials.

The overlay network architecture includes a certificate deployment and management system that enables frequent replacement of certificates. In one embodiment, the overlay network architecture ensures that both end points of every client to server connection are authenticated. An XML firewall allows the overlay network configuration to enable a client to access a web services.

Through a web-based monitoring console, in one embodiment, the overlay network provides additional information about network and server load as well as utilization statistics.

Controller Configuration

Overlay Network Configuration

In one embodiment, the overlay network is configured through controller 120. An administrator may coordinate with controller 120 to configure the system. As discussed above, TAPs 111-114 establish and maintain permanent connections (e.g., a TCP connection) to controller 120. An administrator sets up controller 120 with some configuration information, such as, for example, but not limited to, information about what services are available and where the service can be accessed from (e.g., which TAP(s) are used to access the server on which the service running).

In one embodiment, the controller configuration also includes setting up the controller with forwarding and routing tables. These tables may be combined into a single table. The forwarding and routing tables indicate where services are available, specify TAPs to which a service will be forwarded, and indicate how to reach TAPs where a service is available. More specifically, the routing table indicates the routes a TAP can take to each of the other TAPs. The routing table may include priority information indicating the priority level for the use of each route when there are more than one route to a particular TAP. The routing table may also include load-balancing information to automatically load-balance over multiple routes or to failover from one route to another. In one embodiment, the routing table includes security, and/or authentication information.

The forwarding table indicates where and how a destination TAP is to access a server (i.e., service). Note that the routing path used to access a service may not be the closest or shortest path. These may be instances when such paths are busy or damaged.

In one embodiment, the configuration information provided to TAPs 111-114 from controller 120 indicates which client(s) are able to access a particular service. The configuration information may include an indication (e.g., a list) of what resources are necessary to provide service. For example, the configuration information may indicate that a CPU having a particular speed or a memory of certain size is required to access a particular service.

In one embodiment, the controller configuration of the TAPs includes controller 120 providing XML firewall rules to TAPs 111-114. In one embodiment, a set of XML firewall rules exist for each service and indicates the kind of request to access that are acceptable for that service and what kinds of requests would be objected to, the use of which is explained in more detail below. In one embodiment, the XML firewall rules are applied to the HTTP headers. In another embodiment, the XML firewall rules are applied to the TCP, UDP, or IP headers. In one embodiment, the XML firewall supports integration with directory services such as LDAP or RADIUS. These directory services can supply user credentials, which can be used as filters in the XML firewall. For example, the XML Firewall can be configured to require a user to be part of a certain group to get access to a service.

TAP Setup/Initialization

After configuration, the overlay network is brought online, which includes initializing TAPs 111-114. In one embodiment, TAPs 111-114 in the system are initialized using a TAP administrator. The TAP administrator selects an operating mode for each TAP. In one embodiment, the TAP administrator assigns each TAP to act in either transparent proxying mode or explicit proxying. In explicit proxying mode, a client making a request directly contacts a TAP that provides access to the desired service (e.g., access to the server providing the services). In transparent proxy mode, the client does not have a particular TAP or TAPs to contact to gain access to a service, only an indication of the server(s) to use. In such a case, a TAP in the overlay network intercepts the request unknown (transparently) to the client. In one embodiment, a TAP can run in both modes at the same time when providing access to multiple services and/or multiple servers.

In one embodiment, as part of TAP initialization, and for the purposes of security, the overlay network performs a certificate deployment process. This process ensures that TAPs are authenticated. In one embodiment, each TAP has a certificate for use in authentication.

Figure 2:
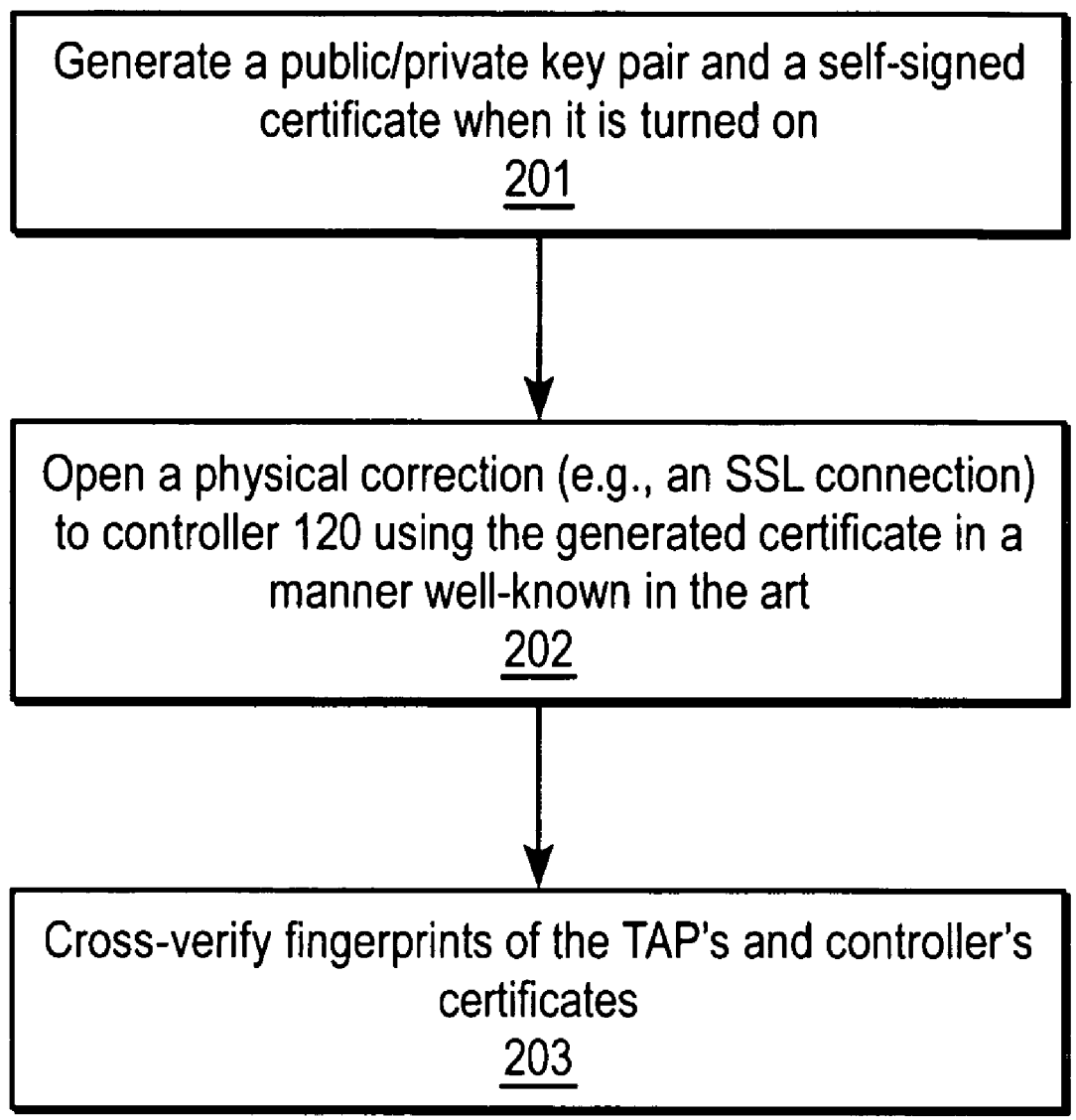
FIG. 2 is a flow diagram of one embodiment of a process for certificate deployment.

FIG. 2 is a flow diagram of one embodiment of the certificate deployment process. The process is performed by processing logic that may comprise hardware (e.g., circuitry, dedicated logic, etc.), software (such as is run on the general purpose computer system or a dedicated machine), or a combination of both.

Referring to FIG. 2, the process begins by processing logic in the TAP generating a private-public key pair and a certificate signing request (CSR) when it is turned on. The TAP then establishes a connection with the controller and presents the CSR and requests a certificate. During this operation, processing logic cross-verifies fingerprints of the controller's and TAP's certificates. Such cross-verification using fingerprints of the certificates is well-known in the art. Once the TAP's request is authorized on the controller (or, if it is set to automatic), the controller sends a certificate to the TAP. The TAP then closes the existing connection and opens another connection with the controller using the newly obtained certificate in a manner well-known in the art (processing block 202).

In one embodiment, manual verification may be performed for security sensitive installations. The manual verification operations that are involved enable both the controller 120 and a TAP to agree that they are talking to each other. They may use administrators for this. These administrators would use computers (e.g., laptops) connected to the TAP and controller 120. The administrator of controller 120 sees the fingerprint of the TAP's certificate, while the administrator of the TAP sees the fingerprint of the controller's certificate. The two administrators, using an alternative medium (e.g., phone), will request each other's certificate fingerprint and confirm it matches the one received through the overlay network. Assuming a match occurs, controller 120 accepts the TAP and provides it with a name to which its valid certificate will be associated for use in the overlay network. Note that this could be done automatically.

Once accepted, controller 120 sends forwarding data over a secure connection between the TAP and controller 120 to enable the TAP to forward requests and responses to the correct TAPs in the overlay network. At this point, the TAP is allowed to listen for requests in the overlay network.

Tap actions Upon Receiving a Configuration

In one embodiment, after configuration and initialization, the TAP listens for requests for services and uses the forwarding and routing tables to know where to send the requests.

Figure 3:
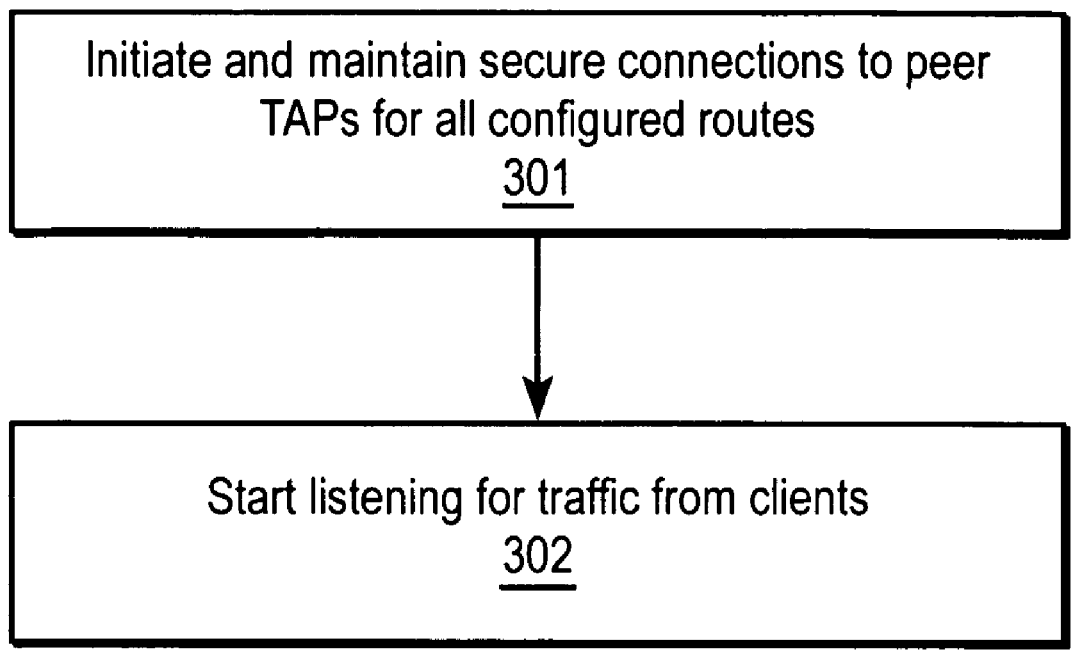
FIG. 3 is a flow diagram of one embodiment of a set up process performed by processing logic in the TAP.

FIG. 3 is a flow diagram of one embodiment of the process performed by processing logic in the TAP. The processing logic may comprise hardware (e.g., circuitry, dedicated logic, etc.), software (such as is run on the general purpose computer system or a dedicated machine), or a combination of both.

Referring to FIG. 3, the process begins by processing logic in the TAP initiating maintaining secure control connections to peer TAPs for all (or some of the) configured routes (processing block Y01). This may be done using a similar electronic verification scheme performed above. In one embodiment, controller 120 generates and issues a secret session key to both TAPs in a route, and, in response thereto, each TAP verifies that its peer has the secret session key. Note that controller 120 issues these keys to both TAPs desiring to set up their connection in response to a request from each TAP. Once they each have a session key, both TAPs attempt to connect with each other, thereby resulting in a near simultaneous connection with each other. This process results in authentication because controller 120 has already authenticated each TAP and has a secure connection with each TAP.

Note that when new TAPs are brought into the system, the controller coordinates the process of making sure that it establishes secure connections to all other TAPs with which it needs to communicate. By having both TAPs attempt to establish the connection, any intervening component (e.g., a firewall) that could stop communications of one TAP from reaching the other TAP is less likely to prevent a connection from being made. This verification may be performed by sending a challenge and receiving a challenge-response. After initiating and maintaining secure connections to other TAPs, processing logic in the TAP starts listening for traffic from clients (processing block 302).

Request/Response Processing

Request Processing at the Origin TAP

Figure 4:
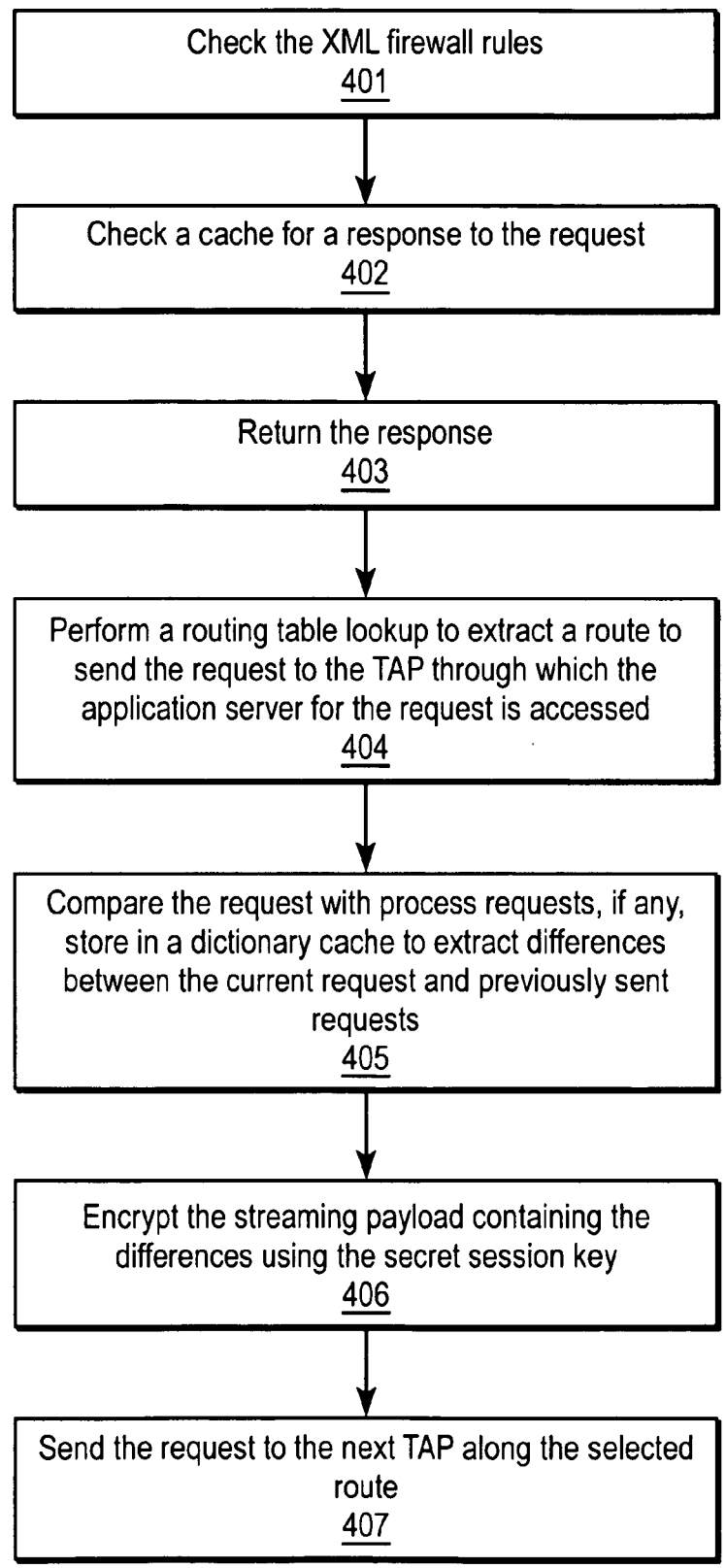
FIG. 4 is a flow diagram of one embodiment of a request processing process performed by an originating TAP.

When listening for requests, TAPs receive requests either explicitly or implicitly. In the case where the TAP receives the request from a client (i.e., the originating TAP), the originating TAP performs request processing. FIG. 4 is a flow diagram of a process performed by the originating TAP to process such a request. The process is performed by processing logic in that TAP that may comprise hardware (e.g., circuitry, dedicated logic, etc.), software (such as is run on the general purpose computer system or a dedicated machine), or a combination of both.

Referring to FIG. 4, in one embodiment, the process begins by processing logic in the TAP that checks the XML firewall rules (processing block 401). As discussed above, the set of XML firewall rules exist for each service and indicates the kinds of requests that are acceptable for that service and the kinds of requests that would be rejected. When the TAP checks the XML firewall rules, the TAP examines the request itself to obtain certain properties and either accepts or rejects the request based on the comparison between the properties and the XML firewall rules. Thus, the TAP determines whether the request is acceptable. Acceptability of a request can be based on a number of different properties such as, for example, part numbers, IP addresses, URLs, HTTP header fields, user privileges, and XML content. In alternative embodiments, other rules such as, for example, rules applied to HTTP headers and TCP filters, may be used.

Processing logic then checks a cache for a response to the request (processing block 402). The cache is accessible to the TAP. In one embodiment, the TAP is an appliance, and the cache is part of the appliance. Note whether caching is available may be dependent on the service being requested. Some services may permit caching, while others may not.

In one embodiment, in order to reduce server load, data expiration dates (DED) are used in which caching policies employed by TAPs can be configured centrally and distributed enterprise-wide. Data "freshness" can be defined at the TAP. Using DED, the overlay network can maintain dynamic content for a period of time before it has to be regenerated by the server. If any client application in the network requests that content, and one of the TAPs already has a fresh copy, the client will get the content from that TAP instead of requesting it from the server. This reduces server load by preventing certain services requests from reaching the server if they can be serviced with information stored on a TAP. In one embodiment, the period of time is user configurable or alterable.

In one embodiment, the overlay network allows one or more TAPs to provide duration-based caching in which certain responses are cached for preselected periods of time. In one embodiment, the preselected period of time is indicated by the server that provides the response initially. Alternatively, a default period of time may be utilized. In another embodiment, the controller sets forth the default periods of time. In another embodiment, the controller is able to override any period of time specified by an application server. In one embodiment, the default time period is configured at the controller.

Dependency-based caching allows for specifying which XML services invalidate cached data for other services. For example, a "credit account" function would invalidate the cached value of an "account balance" function, but not the cached value of a "list of all accounts" function. In one embodiment, the overlay network can specify that a call to "credit account" immediately expire any cached result of the "account balance" function for a given account number, but not the cached data of the "list of all accounts" function, which can still be safely and securely returned from the TAP front ending the application server. In one embodiment, the customer can define a dependency graph for all the XML services offered to indicate to the system when to expire the cached result of a service.

If the response is available, processing logic returns the response (processing block 403). Because the request does not have to be sent over the overlay network and the response doesn't have to be sent over the overlay network, there is savings in bandwidth and reduction in the load on the server, both of which are beneficial. In one embodiment, this applies only to the duration cache; the dependency cache is located on the TAP closest to the server, so traffic still has to traverse the overlay network. Thus, the dependency cache reduces server load but not overlay network traffic.

If the response is not available in the cache, processing logic performs a routing table lookup to extract a route to send the request to the destination TAP through which the application server for the request is accessed (processing block 404). The TAP initially obtains a list of routes to the destination TAP, excludes the routes that are not usable at the time (e.g., routes that are not currently active), and selects a route from the usable routes. Note that the list of routes may be ordered to allow for failover from a primary route to secondary or tertiary routes, or it may be un-ordered, which would allow for load-balancing of traffic over all usable routes.

In one embodiment, the controller uses connection availability between TAPs to determine availability of individual routes. This feature may be used to facilitate fault tolerance and load balancing. In one embodiment, TAPs can be configured to automatically load-balance over multiple routes, and to failover from one route to another. This information will be included in the routing table. When deciding between routes, a priority scheme may be used in which the high priority route is to be used first, if available, followed, in turn, by the next highest priority route.

In one embodiment, the overlay network architecture accelerates applications by using a dictionary cache to eliminate redundant traffic. This can result in an improvement of application response time and potentially orders of magnitude savings of bandwidth and elimination of network round trips. Redundant Traffic Elimination (RTE) is achieved when processing logic compares the request or portions of the request with previously sent (if any) requests or portions of requests, which are stored in a dictionary cache, and extracts differences between the current request and previously sent requests (processing block 405). The extraction of differences using the dictionary cache is a way to perform dictionary-based compression. A goal of dictionary-based compression in this instance is to reduce the amount of data that is sent as part of the request (or response when used in the reverse direction). This may be used to manage the bandwidth usage in the overlay network. In using dictionary-based compression, portions of the request are compared to the dictionary cache and where portions of the request appear in the dictionary cache, each of those portions are replaced with references (e.g., an index) that would be identifiable to the next TAP receiving the request, thereby enabling the TAP to reconstruct the request. In one embodiment, the binary difference between items in the dictionary cache and the requests is made. The comparisons may occur on a byte-by-byte basis, word-by-word basis, or other well-known basis. In one embodiment, an index replaces the portion of the request that appears in the dictionary cache. The index is used by the TAP that receives the request to reconstruct the request by searching its dictionary cache using the index in a manner well-known in the art. Note that TAP may then perform its own dictionary-based compression to compress the reconstructed request and to send it on to another TAP.

Note that the first time that a TAP identifies one or more portions of a request that are suitable for replacement, the TAP makes a replacement and also sends data indicative of the index and the replacement to the next TAP (and potentially other TAPs) so that the next TAP can incorporate that information into its dictionary cache. In this manner, all the directory caches include the same information.

To reiterate, the use of dictionary-based comparison is performed by TAPs for responses to requests as well.

In one embodiment, a dictionary cache is associated with each service, although this is not required. Thus, there are multiple dictionaries that may be used based on the service that is being requested or responded to. In another embodiment, the dictionary cache is associated with each TAP. In other words, each TAP maintains as many dictionary caches as it maintains connections to other TAPS. In yet another embodiment, the dictionary cache is global—each TAP maintains one dictionary cache.

After extracting the differences, processing logic encrypts the streaming payload containing the differences using the secret session key (processing block 406) and sends the request to the next TAP along the selected route (processing block 407).

In one embodiment, the encryption and sending operations are controlled by per-stream window-based flow control. More specifically, in order to avoid certain streams from being starved, large requests are broken up into smaller pieces such that portions of multiple requests may be multiplexed onto a connection during a window of time. In such a case, each portion will be divided up before they are encrypted, such that each portion is encrypted separately. Note also that the flow control is end to end in that there is only a certain window of time in which information may be sent and acknowledged and if it is not acknowledged during that period of time, on a per-stream basis on a TAP-to-TAP connection, the sending of information for a particularly stream may be stopped until that information is acknowledged, or it may be resent.

Request Processing at a Destination TAP

When the destination TAP receives the request, the destination TAP performs a lookup in the appropriate dictionary cache and reconstructs the stream block data comprising the request. Once reconstructed, the destination TAP examines its forwarding table to determine to which server the request is to be sent and its location. There may be more than one server that can handle the request and the forwarding table indicates which is to be used. If there is more than one server that can handle the request, then either a failover (if the servers are in an ordered list) or load-balancing occurs (unordered list), in a manner similar to the way a route is selected above.

Figure 5:
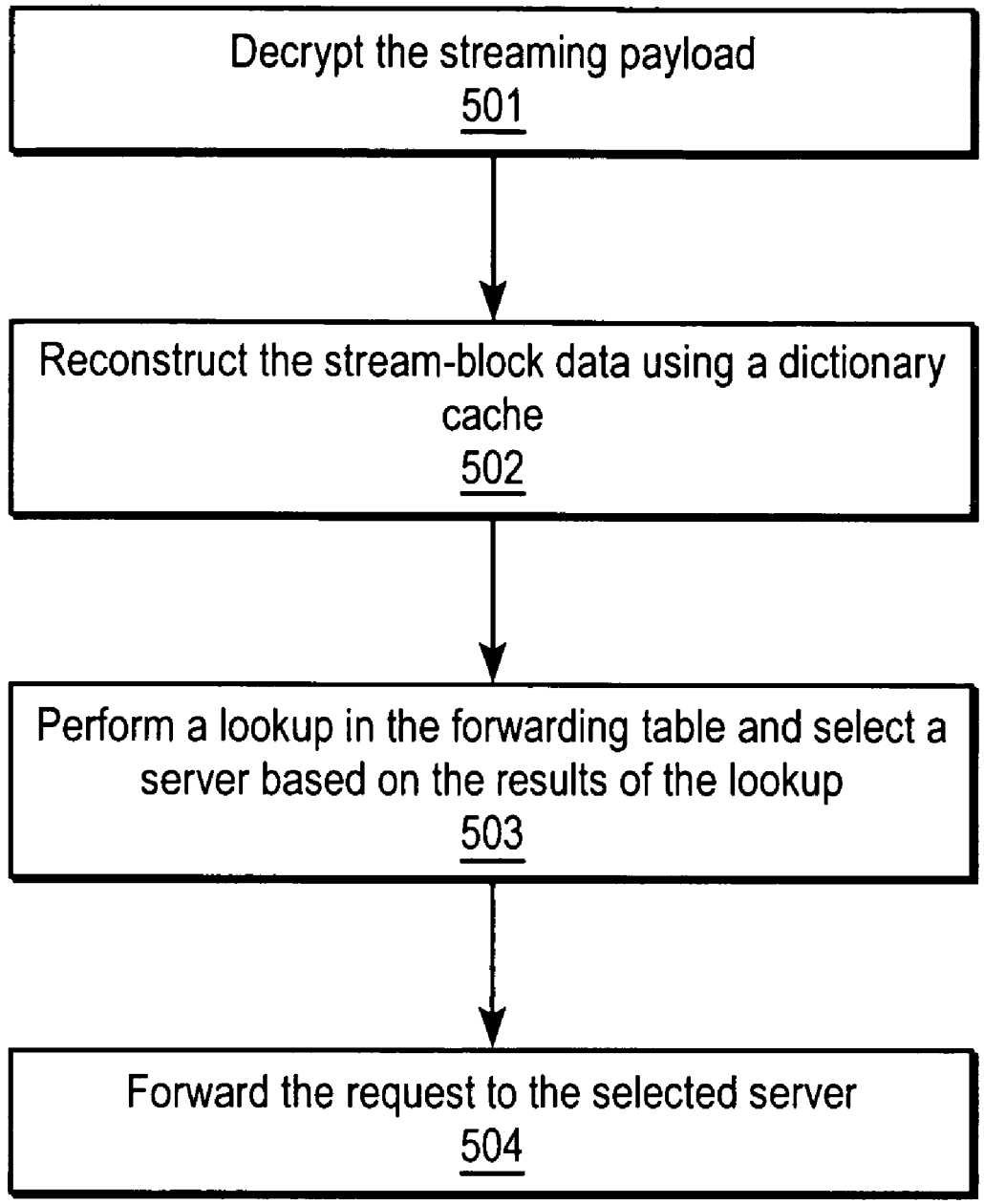
FIG. 5 is a flow diagram of one embodiment of a process for handling a request performed by a TAP that receives the request.

FIG. 5 is a flow diagram of one embodiment of a process for handling a request performed by a TAP that receives the request from another TAP. The process is performed by processing logic in that TAP that may comprise hardware (e.g., circuitry, dedicated logic, etc.), software (such as is run on the general purpose computer system or a dedicated machine), or a combination of both.

Referring to FIG. 5, the process begins by processing logic decrypting the streaming payload (processing block 501). After decryption, processing logic reconstructs the stream-block data using a dictionary cache (processing block 502). Once reconstruction has been completed, processing logic performs a lookup in the forwarding table and selects a server based on the results of the lookup (processing block 503). Processing logic then forwards the request to the selected server (processing block 504).

The response to the request follows the reverse path back to the client that made the request using all of the same optimizations that were used when request was being sent (e.g., dictionary-cache based compression, load-balancing algorithms, etc.).

Scalability

In one embodiment, scalability may be achieved by exporting the same service through multiple TAPs. That is, there are multiple destination TAPs that may be used to access the same server. Therefore, if the load on a set of one or more servers is high and access to a particular service is not fast, then the overlay network may easily be modified to include another TAP (and potentially an additional server) to supply the service.

Figure 6:
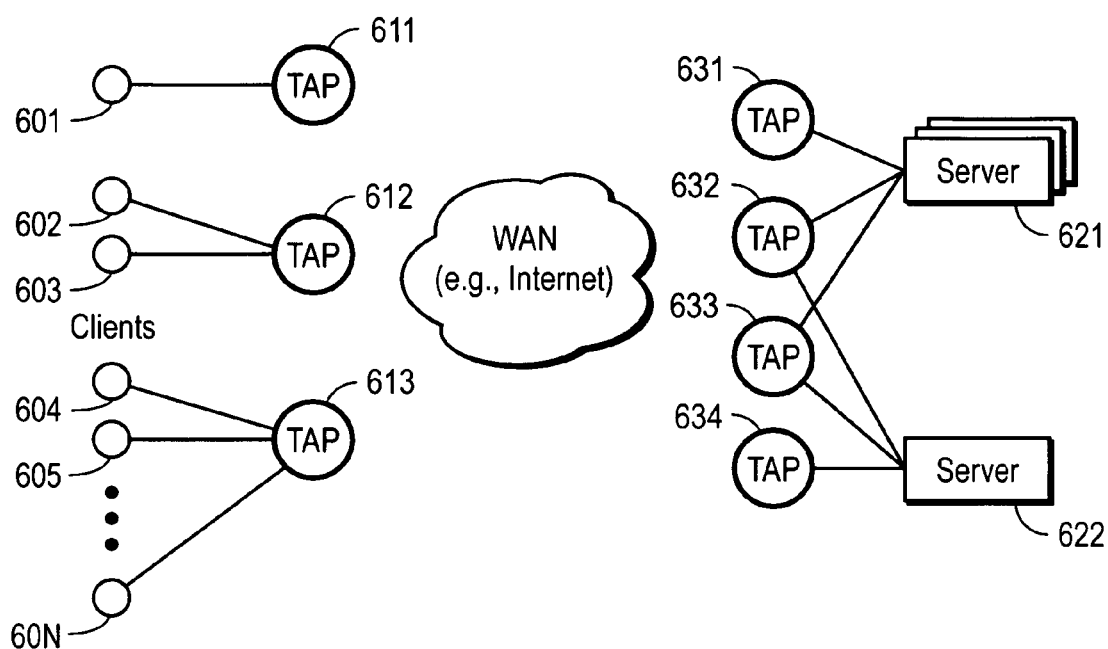
FIG. 6 illustrates scalability of one embodiment of an overlay network.

FIG. 6 illustrates such an arrangement and it is similar to routing in a load-balanced mode. Referring to FIG. 6, one or more clients send requests through a TAP. As shown, client 601 sends requests and receives responses via TAP 611. Clients 602 and 603 send requests and receive responses via TAP 612. Clients 604-60N send requests and receive responses via TAP 613. A first set of one or more servers 621 receives requests and sends responses via TAPs 631-633, while a second set of one or more application servers 622 receives requests and sends responses via TAPs 632-634. Note that a TAP can send requests and receive responses from more than one set of one or more servers.

Note that having a server accessible via multiple TAPs provides a form of redundancy, which, in turn, provides for fault-tolerance.

Miscellaneous Benefits

Figure 7:
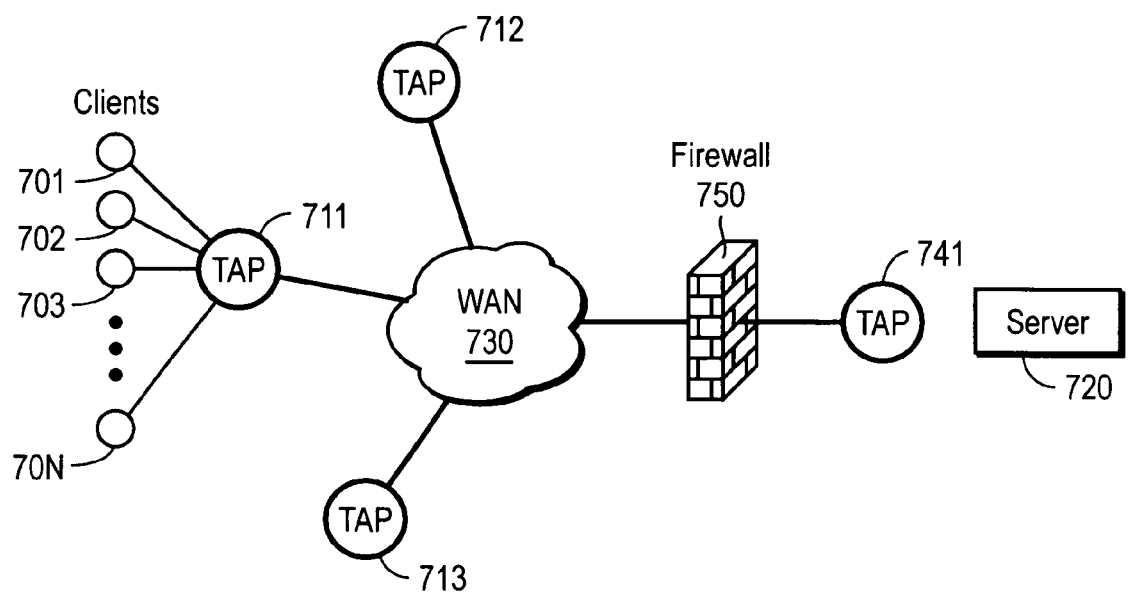
FIG. 7 illustrates a firewall configured to allow only outgoing connections from the TAP near the application server.

The system of the present invention can be used to prevent denial-of-service (DoS) attacks. This can be accomplished by configuring a firewall to allow only outgoing connections from the TAP near the application server. This is shown in FIG. 7. In such a case, no party can connect directly into the server. The firewall can be configured to not allow any incoming connections. Thus, only outward connections may be made. The internal TAP connects out to the external TAPs. The internal TAP can connect to the server because they are both behind the same firewall (but external TAPs cannot connect to either the internal TAP or to the servers).

Referring to FIG. 7, clients, such as client 701-70N, access the service through remote TAPs, such as TAPs 711. In such a case, the server port of server 720 is not exposed to the external wide area network (WAN) 730 because of firewall 750. A denial of service attack on one of TAPs 711-713 cannot affect server 720 or the service at other TAPs, such as TAP 741. Thus, the effects of DoS attacks can be localized. Note that this is useful for any kind of TCP service.

Other benefits are associated with embodiments of the present invention. These include a latency reduction from maintaining pre-established connections between the TAPs. In one embodiment, the request-response latency over the WAN is half of the latency of prior art systems.

Another benefit of the overlay network is centralized real-time logging and administration. In one embodiment, data transfers between applications are centrally monitored and audited (in log files), thus providing a single source for all regulatory compliance information.

Note also that the teachings herein are protocol agnostic and are usable with any TCP, UDP, or IP service. Embodiments of the infrastructure architecture are compatible with existing systems such that they operate seamlessly alongside legacy applications. For example, the infrastructure architecture can be configured to let applications use only a certain fraction of the available bandwidth, leaving enough for other applications.

In one embodiment, the overlay network provides guaranteed once-only delivery of requests and responses under all circumstances, even in case of network link or server failure. The overlay network supports load balancing and failover configurations for better application performance and reliability. Because the overlay network includes these communication features, expensive load balancer hardware to implement highly reliable and available data services is not necessary.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An overlay network comprising:
a plurality of transparent access points (TAPs), wherein each TAP is communicably coupled between one or more clients and servers and a wide area network (WAN) to enable the one or more clients to communicate with the one or more servers, and is coupled to other of the plurality of TAPs via permanently, established secure links; a controller coupled to each of the plurality of TAPs via a secure connection to configure the plurality of TAPs with information to enable said each TAP to know what services are available and from which of the plurality of TAPs each of the services can be accessed, wherein the controller provides each TAP with routing and forwarding tables to indicate where one or more services are available, to specify one or more TAPs to which a service will be forwarded, and to indicate how to reach TAPs wherein the service is available.

2. The overlay network defined in claim 1 wherein the permanently, established secure links comprises virtual private networks (VPNs), such that a client communicates with a server over a VPN.

3. The overlay network defined in claim 1 wherein plurality of TAPs consists of one TAP per network segment.

4. The overlay network defined in claim 1 wherein the secure connection comprises an SSL/TLS connection.

5. The overlay network defined in claim 1 wherein the secure connection comprises a TCP connection.

6. The overlay network defined in claim 1 wherein one of the plurality of TAPs is communicably coupled to one of the one or more servers and is communicably coupled to the WAN via a firewall, such that the TAP and the one server are only accessible to TAPs in the plurality of TAPs through the firewall.

7. An overlay network comprising:
a plurality of transparent access points (TAPs), wherein each TAP is communicably coupled between one or more clients and servers and a wide area network (WAN) to enable the one or more clients to communicate with the one or more servers, and is coupled to other of the plurality of TAPs via permanently, established secure links; a controller coupled to each of the plurality of TAPs via a secure connection to configure the plurality of TAPs with information to enable said each TAP to know what services are available and from which of the plurality of TAPs each of the services can be accessed, during configuration, the administrator of the TAP and the controller cross-verify each other using the fingerprint of the TAP'S and controller's certificate.

8. An overlay network comprising:
a plurality of transparent access points (TAPs), wherein each TAP is communicably coupled between one or more clients and servers and a wide area network (WAN) to enable the one or more clients to communicate with the one or more servers, and is coupled to other of the plurality of TAPs via permanently, established secure links; a controller coupled to each of the plurality of TAPs via a secure connection to configure the plurality of TAPs with information to enable said each TAP to know what services are available and from which of the plurality of TAPs each of the services can be accessed, wherein at least one of the plurality of TAPs performs dictionary-based compression on at least one request or response prior to sending the least one request or response over the WAN to a receiving TAP of the plurality of TAPs, the dictionary-based compression replacing at least a portion of the at least one request or response with an index.

9. The overlay network defined in claim 8 wherein the receiving TAP uses a dictionary to reconstruct the at least one request or response that underwent dictionary-based compression.

10. The overlay network defined in claim 8 wherein the at least one TAP sends information to enable reconstruction of the at least a portion of the at least one request or response to the receiving TAP when substituting the index for the portion for the first time.

11. An overlay network comprising:
a plurality of transparent access points (TAPs), wherein each TAP is communicably coupled between one or more clients and servers and a wide area network (WAN) to enable the one or more clients to communicate with the one or more servers, and is coupled to other of the plurality of TAPs via permanently, established secure links; a controller coupled to each of the plurality of TAPs via a secure connection to configure the plurality of TAPs with information to enable said each TAP to know what services are available and from which of the plurality of TAPs each of the services can be accessed, wherein one TAP of the plurality of TAPS receives a request for a designated server from one of the clients and checks a cache to determine whether a response to the request is already stored in the cache, the one TAP sending the response from the cache to satisfy the request, instead of sending the response over the WAN toward the designated server.

12. The overlay network defined in claim 11 wherein the cache stores the response for a period of time.

13. The overlay network defined in claim 12 wherein the period of time is set by the designated server.

14. The overlay network defined in claim 12 wherein the period of time is set by the controller.

15. The overlay network defined in claim 14 wherein the controller over-rides the period of time set by the designated server and sets the period of time.

16. The overlay network defined in claim 11 wherein the cache stores the response until an event occurs.

17. A method comprising:
configuring a plurality of transparent access points (TAPs), using a controller, to enable the one or more clients to communicate with the one or more servers over a wide area network (WAN), where each TAP is communicably coupled between the one or more clients and servers and is coupled to other of the plurality of TAPs via permanently, established secure links, and further wherein the controller is coupled to each of the plurality of TAPs via a secure connection, including providing information to enable said each TAP to know what services are available and from which of the plurality of TAPS each of the services can be accessed, and providing each TAP with routing and forwarding tables to indicate where one or more services are available, to specify one or more TAPs to which a service will be forwarded, and to indicate how to reach TAPs wherein the service is available.

18. A method comprising:
configuring a plurality of transparent access points (TAPs), using a controller, to enable the one or more clients to communicate with the one or more servers over a wide area network (WAN), where each TAP is communicably coupled between the one or more clients and servers and is coupled to other of the plurality of TAPs via permanently, established secure links, and further wherein the controller is coupled to each of the plurality of TAPs via a secure connection, including providing information to enable said each TAP to know what services are available and from which of the plurality of TAPS each of the services can be accessed, the administrator of the TAP and the controller cross-verifying each other using the fingerprint of the TAP's and controller's certificate during configuration.

19. A method comprising:
configuring a plurality of transparent access points (TAPs), using a controller, to enable the one or more clients to communicate with the one or more servers over a wide area network (WAN), where each TAP is communicably coupled between the one or more clients and servers and is coupled to other of the plurality of TAPs via permanently, established secure links, and further wherein the controller is coupled to each of the plurality of TAPs via a secure connection, including providing information to enable said each TAP to know what services are available and from which of the plurality of TAPS each of the services can be accessed, at least one of the plurality of TAPs performing dictionary-based compression on at least one request or response and then sending the least one request or response over the WAN to a receiving TAP of the plurality of TAPs, the dictionary-based compression replacing at least a portion of the at least one request or response with an index.

20. The method defined in claim 19 further comprising the receiving TAP using a dictionary to reconstruct the at least one request or response that underwent dictionary-based compression.

21. The method defined in claim 19 further comprising the at least one TAP sending information to enable reconstruction of the at least a portion of the at least one request or response to the receiving TAP when substituting the index for the portion for the first time.

22. A method comprising:
configuring a plurality of transparent access points (TAPs), using a controller, to enable the one or more clients to communicate with the one or more servers over a wide area network (WAN), where each TAP is communicably coupled between the one or more clients and servers and is coupled to other of the plurality of TAPs via permanently, established secure links, and further wherein the controller is coupled to each of the plurality of TAPs via a secure connection, including providing information to enable said each TAP to know what services are available and from which of the plurality of TAPS each of the services can be accessed, one TAP of the plurality of TAPs receiving a request for a designated server from one of the clients and checks a cache to determine whether a response to the request is already stored in the cache, the one TAP sending the response from the cache to satisfy the request, instead of sending the response over the WAN toward the designated server.

23. The method defined in claim 22 wherein the cache stores the response for a period of time.

24. The method defined in claim 23 wherein the period of time is set by the designated server.

25. The method defined in claim 23 wherein the period of time is set by the controller.

26. The method defined in claim 25 further comprising the controller over-riding the period of time set by the designated server and sets the period of time.

27. The method defined in claim 25 wherein the cache stores the response until an event occurs.

* * * * *

UNITED STATES PATENT AND TRADEMARK OFFICE
CERTIFICATE OF CORRECTION

PATENT NO. : 7,613,131 B2
APPLICATION NO. : 11/271077
DATED : November 3, 2009
INVENTOR(S) : Decasper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Nineteenth Day of October, 2010

David J. Kappos
*Director of the United States Patent and Trademark Office*